(12) United States Patent
Cheung

(10) Patent No.: US 7,213,817 B2
(45) Date of Patent: May 8, 2007

(54) FOLDABLE TROLLEY

(76) Inventor: Maggie Cheung, Block A1, 3/F, Tsing Yi Industrial Centre, Phase 1, Tsing Yi, N.T. (HK)

( * ) Notice: Subject to any disclaimer, the term of this patent is extended or adjusted under 35 U.S.C. 154(b) by 153 days.

(21) Appl. No.: 10/985,086

(22) Filed: Nov. 9, 2004

(65) Prior Publication Data

US 2006/0097489 A1    May 11, 2006

(51) Int. Cl.
*B62B 3/00* (2006.01)
(52) U.S. Cl. .................. 280/42; 280/639; 280/651; 280/47.35; 280/79.3
(58) Field of Classification Search ............... 280/651, 280/47.35, 79.3, 639, 42
See application file for complete search history.

(56) References Cited

U.S. PATENT DOCUMENTS

| | | | | |
|---|---|---|---|---|
| 1,180,294 | A | * | 4/1916 | Hunter ........................ 220/7 |
| 4,523,768 | A | * | 6/1985 | Dlubala ...................... 280/42 |
| 5,857,695 | A | * | 1/1999 | Crowell ..................... 280/651 |
| 6,079,777 | A | * | 6/2000 | Simmons et al. ......... 297/217.1 |
| 6,213,494 | B1 | * | 4/2001 | Liaw ......................... 280/651 |
| 6,685,199 | B2 | * | 2/2004 | Stravitz et al. ............... 280/42 |
| 6,843,488 | B1 | * | 1/2005 | Tseng ...................... 280/47.35 |
| 6,851,564 | B2 | * | 2/2005 | Ng ............................. 211/149 |

\* cited by examiner

*Primary Examiner*—J. Allen Shriver
*Assistant Examiner*—Cynthia F. Collado
(74) *Attorney, Agent, or Firm*—James E. Brunton, Esq.

(57) ABSTRACT

The present invention provides a foldable, four-wheel trolley of simple, lightweight construction for use in connection with the transport and storage of items of the type typically used in connection with the operation of beauty salons or similar uses. Moreover, the trolley is easily foldable from an expanded, operating configuration into a compact, folded configuration easy to store and transport when not in use. The trolley has a recessed top tray that is removably connected to the foldable trolley frame, and a plurality of storage drawers are slidably mounted within the foldable trolley frame at locations beneath the top tray and supports for hairdryers and other types of tools commonly used in the conduct of beauty salon operations are affixed to the trolley. At the same time the apparatus is strong, stable, and, with a plurality of casters rotatably connected to the lower portion of each of the first and second side frames for ease of movement, is easily maneuverable and convenient to use.

11 Claims, 7 Drawing Sheets

FOLDABLE TROLLEY

BACKGROUND OF THE INVENTION

1. Field of the Invention

The present invention relates generally to portable trolleys or carts. More particularly, the invention concerns a foldable, wheeled trolley for use in connection with the transport of items in a beauty salon.

2. Discussion of the Prior Art

A large number of different types of wheeled trolleys or carts have been suggested in the past. For example, wheeled carts have long been used in convenience and grocery stores to transport items throughout the store. Similarly, wheeled carts are frequently used in garages and manufacturing facilities to hold and transport tools and various kinds of parts used in the conduct of the business.

As a general rule, the prior art wheeled carts are of a sturdy, heavy-duty, bulky construction making them difficult and expensive to transport in commerce. Accordingly, prior art wheeled carts are typically disassembled for shipment and then are reassembled at the location of use. Because of the complexity of construction of many of the prior art wheeled carts, assembly of the carts at the point of use can be difficult and time-consuming.

A primary object of the present invention is to provide a lightweight, four-wheeled trolley or cart of simple, lightweight construction for use primarily in beauty salons. Advantageously, the trolley is capable of being folded for a substantial reduction in size and shape making it easy to store when not in use and permitting it to be easily and inexpensively shipped in commerce. However, when the trolley is assembled into an operating configuration it is quite stable and because of its unique design is capable of conveniently carrying a wide variety of tools and supplies of the character typically used in the operation of a beauty salon. More particularly, the trolley is provided with a readily accessible, recessed top tray for conveniently carrying small tools and supplies and a plurality of light-weight drawers slidably carried within the trolley frame below the top tray for carrying and storing larger tools and supplies. Additionally, in one form of the invention, readily accessible, side mounted tool racks are pivotally connected to the top tray. When not in use these tool racks can be pivoted into a downward location proximate the sidewalls of the trolley frame to enable the trolley to be used in confined spaces.

SUMMARY OF THE INVENTION

It is an object of the present invention to provide a foldable, four-wheel trolley of a simple, lightweight construction for use in connection with the transport and storage of items of the type typically used in connection with the operation of beauty salons.

It is another object of the invention to provide a trolley of the aforementioned character which can be easily folded from an expanded, operating configuration into a compact, folded configuration making it easy to store and transport when not in use.

Another object of the invention is to provide a trolley as described in the preceding paragraphs which, when assembled into an operating configuration, is strong, stable, easily maneuverable and convenient to use. More particularly, it is an object of the invention to provide such a trolley, which includes a readily accessible, recessed top tray that is removably connected to the foldable trolley frame and a plurality of storage drawers slidably mounted within the foldable trolley frame at locations beneath the top tray.

Another object of the invention is to provide a four wheeled trolley of the class described, which includes conveniently located, side mounted supports for supporting hairdryers and other types of tools commonly used in the conduct of beauty salon operations.

By way of brief summary, one form of the foldable, four wheeled trolley of the present invention comprises a supporting structure which includes first and second spaced apart, generally parallel upright side frames, each having an upper portion and a lower portion. A plurality of casters are rotatably connected to the lower portion of each of the first and second side frames. A plurality of foldable link assemblies foldably interconnect the first and second side frames to permit movement of the side frames between a first operating position and a second folded position. The foldable link assemblies each comprise first and second pivotally connected links, the first link being pivotally connected to the first side frame and the second link being pivotally connected to second side frame. A top member is removably connected to upper portions of the first and second side frames of the supporting structure when the side frames are in the first operating position and a plurality of drawers disposed between and slidably interconnected with the first and second side frames when the side frames are in the first operating position. Each of the drawers is slidably movable between a first retracted position and a second extended position relative to the supporting structure.

DESCRIPTION OF THE INVENTION

Figure 1:
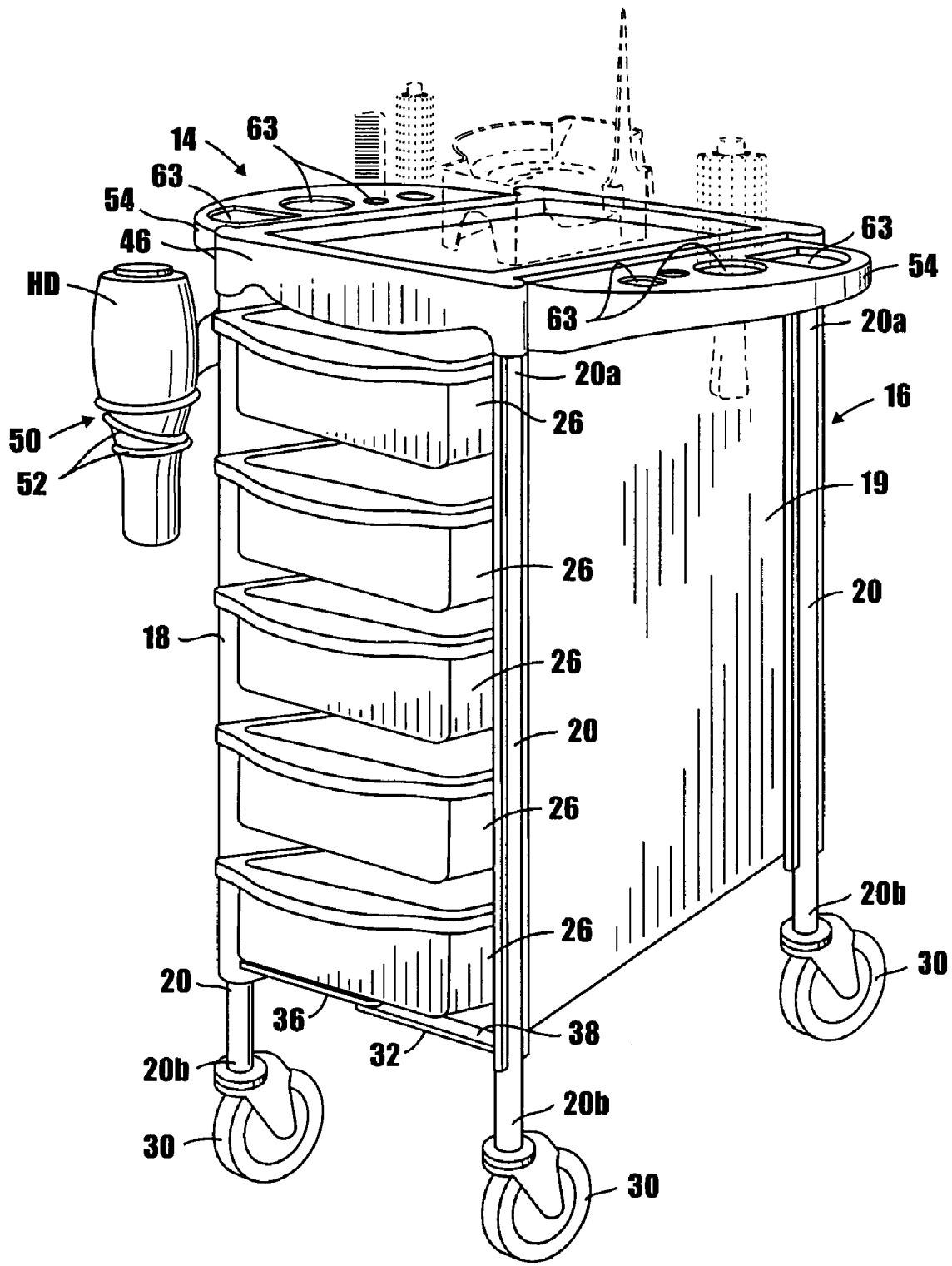
FIG. 1 is a generally perspective view of one form of the foldable trolley of the present invention.
Figure 2:
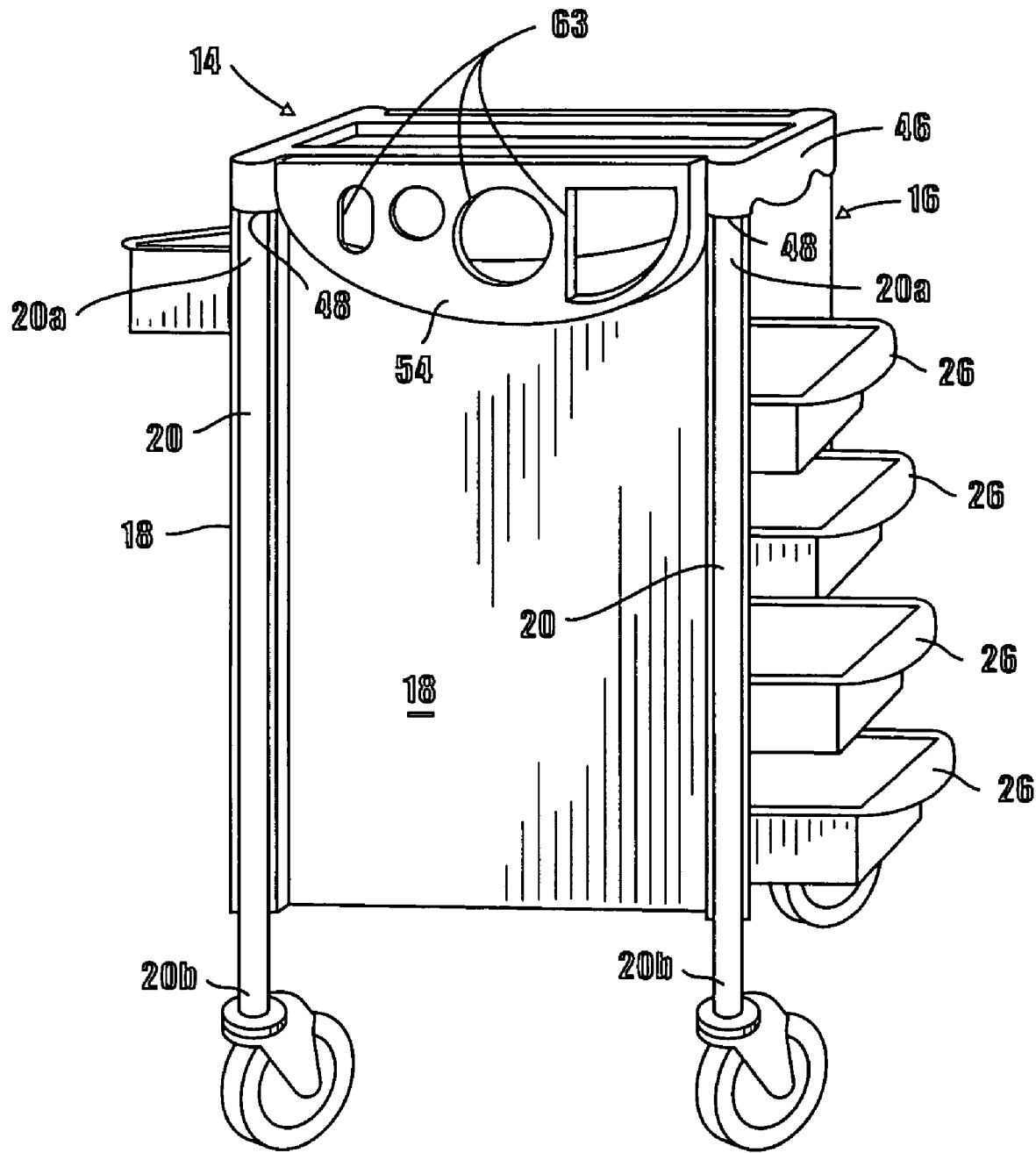
FIG. 2 is a side view of one form of the foldable trolley of the present invention showing the tool holder component of the apparatus folded downwardly and the drawers moved into an outward position.
Figure 3:
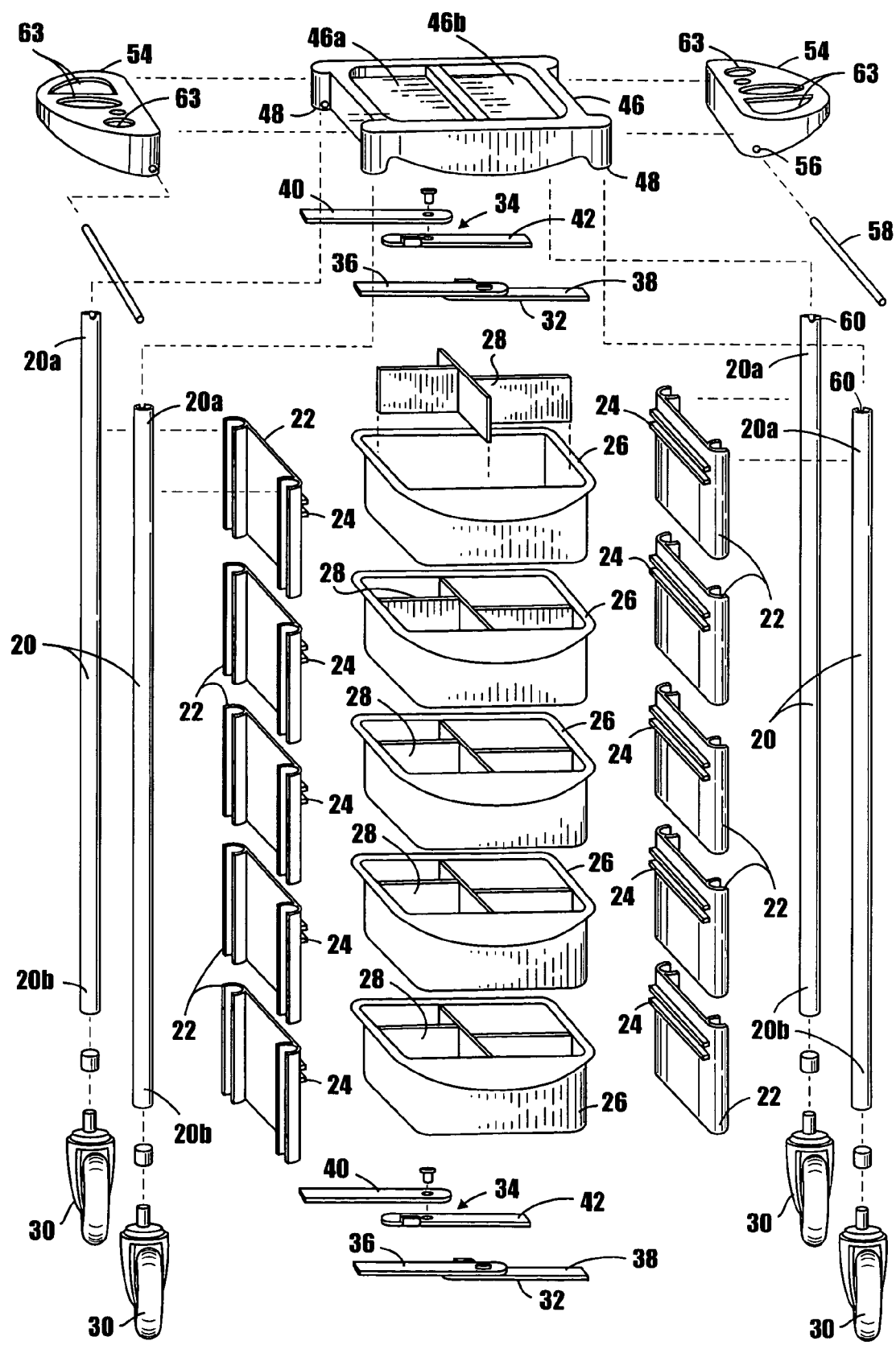
FIG. 3 is a generally perspective, exploded view of the foldable trolley shown in FIG. 1 of the drawings.

Referring to the drawings and particularly to FIGS. 1, 2 and 3, one form of the foldable trolley of the present invention is there shown generally designated by the numeral 14. The foldable trolley of this form of the invention, which is specially designed for use in beauty salons for transporting articles from place to place, comprises a supporting structure 16 which includes first and second spaced apart, generally parallel, substantially upright first and second side frames 18 and 19. Each side frame has an upper portion and a lower portion and each includes a pair of longitudinally spaced apart, generally parallel tubular columns 20 (FIG. 3). Each of the columns 20 has an upper extremity 20a and a lower extremity 20b. A plurality of vertically spaced, generally horizontally extending side panels 22 are connected to tubular columns 20 in the manner illustrated in FIG. 3. Connected to each of the side panels 22 are guide means, here provided as drawer guide rails 24, which are adapted to slidably support the storage means of the invention for storing various articles. The storage means is here provided as a plurality of storage trays or drawers of the configuration shown in the drawings. As illustrated in FIG. 3 storage trays 26 include partition assemblies 28 which function to divide the trays into a plurality of article storage compartments.

To enable the foldable trolley to be conveniently moved about within the beauty salon, a conventional, readily commercially available caster assembly 30 is rotatably connected to the lower extremity 20b of each of the tubular columns 20 of the first and second side frames 18 (See FIG. 1).

Figure 4:
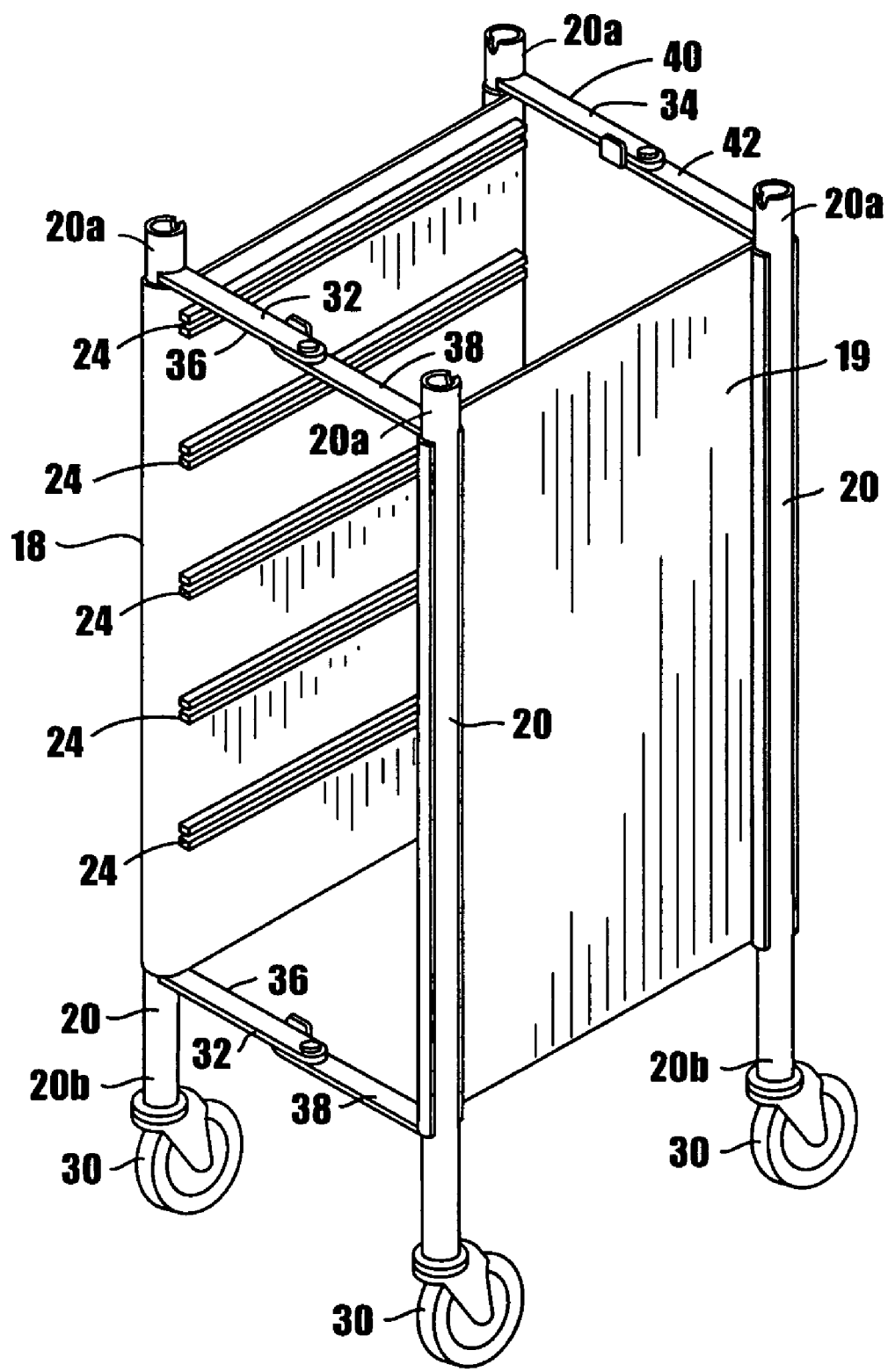
FIG. 4 is a generally perspective fragmentary view of one form of the supporting frame of the foldable trolley of the invention.
Figure 5:
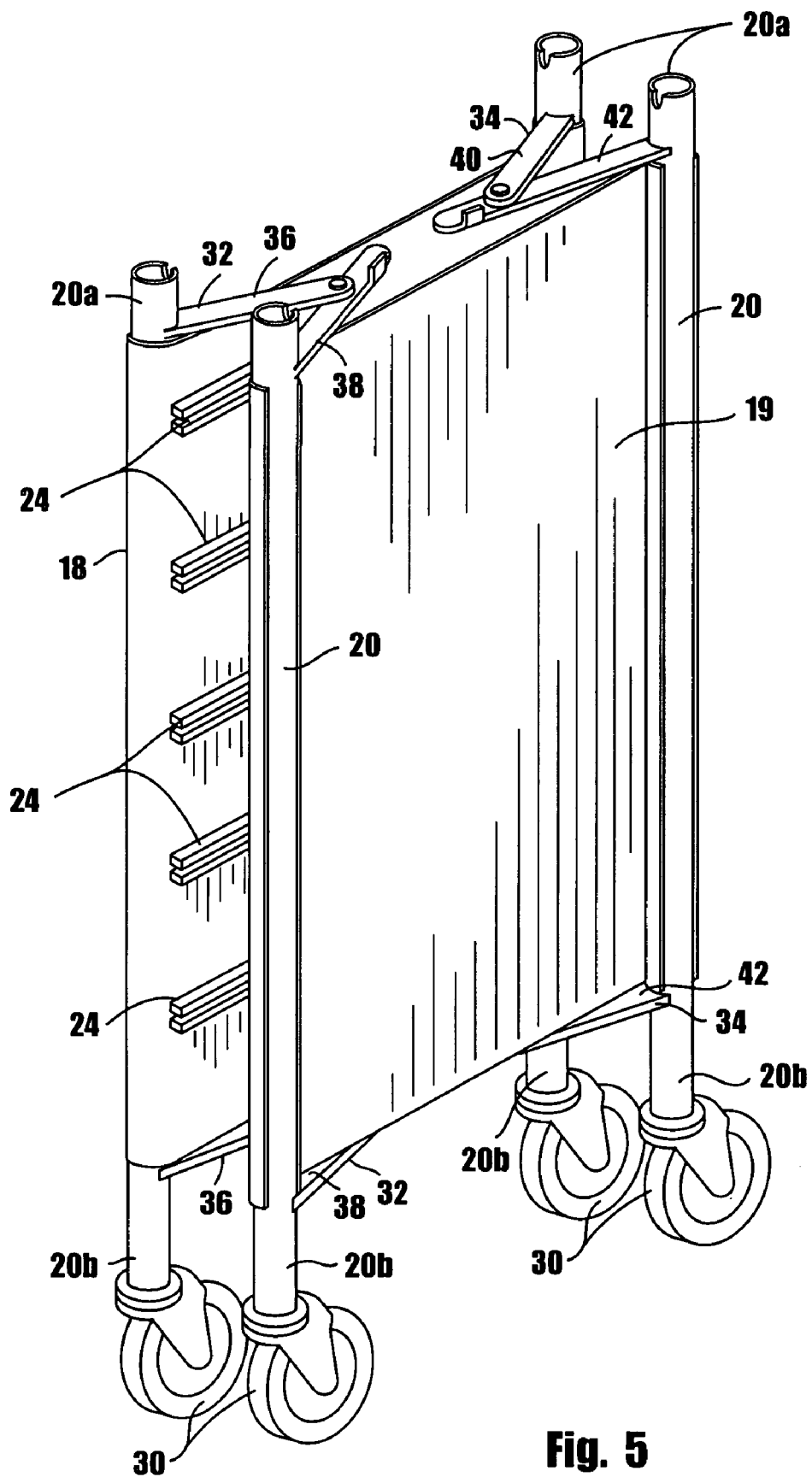
FIG. 5 is a generally perspective, fragmentary view similar to FIG. 4, but showing the supporting frame of the trolley in a folded configuration.

In order to enable the supporting frames of the apparatus to be folded from the first operating configuration shown in FIG. 4 to the second folded configuration shown in FIG. 5, a pair of front, or first foldable link assemblies 32 are connected to the front columns of the supporting frame and a pair of rear, or second foldable link assemblies 34 are connected to the rear columns of the supporting frame. As best seen in FIG. 4, each of the first foldable link assemblies 32 comprise first and second pivotally connected links 36 and 38 respectively, while each of the second foldable link assemblies 34 comprise third and fourth pivotally interconnected links 40 and 42 respectively. First links 36 of each of the first link assemblies is pivotally connected to one of the columns 20 of the first side frame 18 and second links 38 of each of the first link assemblies is pivotally connected to one of the columns 20 of the second side frame 19. In similar fashion, third links 40 of each of the second link assemblies 34 are pivotally connected to first side frame 18 and fourth links 42 of each of the second link assemblies are connected to one of the columns 20 of the second side frame 19. Links 36 and 38 of each of the first link assemblies 32 are pivotally interconnected at their distal ends and links 40 and 42 of each of the second link assemblies 34 are pivotally interconnected at their distal ends so as to enable the link assemblies to fold from the operating configuration shown in FIG. 4 into the folded configuration shown in FIG. 5.

When the support structure 16 of the apparatus is in the operating configuration shown in FIG. 4, a molded plastic top member 46 is removably connected to the upper portions 20a of the columns 20 of first and second side frames of the supporting structure in the manner shown in FIGS. 1 and 2. As best seen in FIG. 3, molded plastic top member 46 has first and second article receiving recesses 46a and 46b for receiving various types of equipment and supplies of the character illustrated in phantom lines in FIG. 1. Top member 46 is also provided with a plurality of spaced apart sockets 48 which are constructed and are arranged proximate each corner of top member 46 to closely, telescopically receive the upper extremities of the tubular columns 20 of the first and second side frames 18 and 19.

As indicated in FIGS. 1 and 2, the plurality of drawers 26 are disposed between the first and second side frames 18 and 19 of the supporting structure 16 when the side frames are in the first operating position shown in FIGS. 1 and 2. As illustrated in FIG. 2, the drawers 26 are slidable along guide rails 24 between a first retracted position and a second extended position to gain access to the articles contained within the drawers.

As is also illustrated in FIG. 1, foldable trolley of the invention also includes hair dryer support means connected to a selected one of the tubular columns 20 of one of the first and second side frames for removably supporting a hairdryer HD. This hairdryer support means here comprises a support member 50 that is constructed from a plurality of coils of heavy wire 52, the proximal end of which is interconnected by any appropriate means to one of the supporting columns 20.

Also forming an important feature of the foldable trolley apparatus of the invention is a pair of oppositely disposed article support members 54 which extend from and are pivotally interconnected with the spaced apart, parallel columns 20 which form a part of the each of the side structures 18 and 19 of the supporting structure 16. More particularly, as best seen in FIG. 3, each of the support members 54 is provided with a bore 56 which closely receives a pivot bar 58, the ends of which are received within slots 60 formed in the top portions 20a of the columns 20. With this construction, each of the article support members 54 can be pivoted from the position shown in FIG. 1 to the folded position shown in FIG. 2. As indicated in FIGS. 1 and 2, each of the article support members 54 is provided with a plurality of apertures 63 of various shapes that are adapted to removably receive brushes and other tools and implements of the character shown by the phantom lines in FIG. 1.

When the foldable trolley of the present invention is in the operating configuration shown in FIG. 1, it may be conveniently rolled about the beauty salon so as to make the beauty equipment and supplies carried thereby readily accessible to the beauty technicians. When the apparatus is to be used in tight locations, one or both of the side members 54 can be pivoted into the lowered position wherein they reside proximate the side panels of the supporting structure. When it is desired to place the trolley in condition for shipment or storage, the trolley can be quickly and easily folded into a compact, folded configuration in the manner described in the paragraphs which follow.

Figure 6:
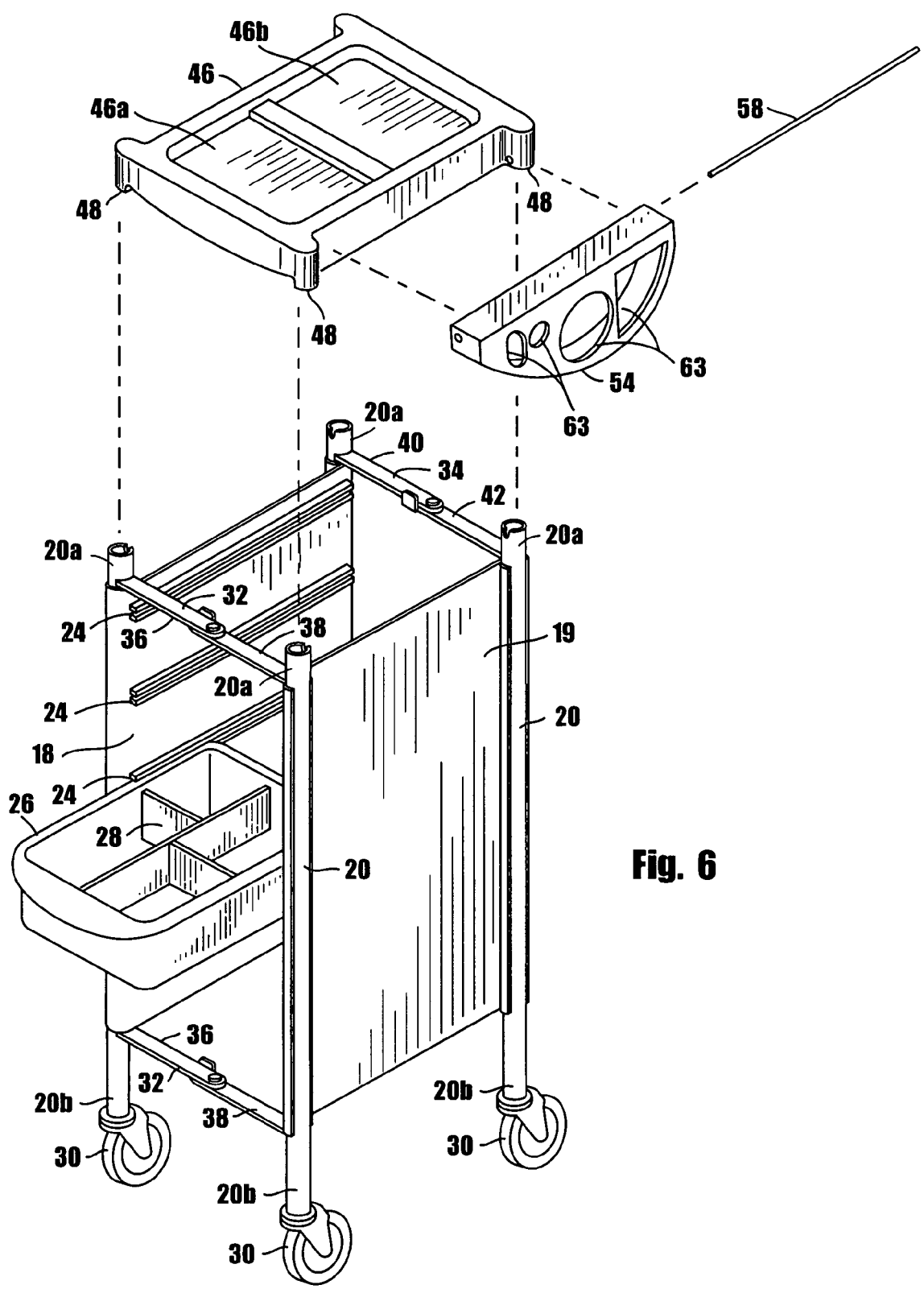
FIG. 6 is a generally perspective fragmentary, exploded view of the supporting frame of the foldable trolley and of certain of the components of the apparatus that are mounted on the supporting frame.
Figure 7:
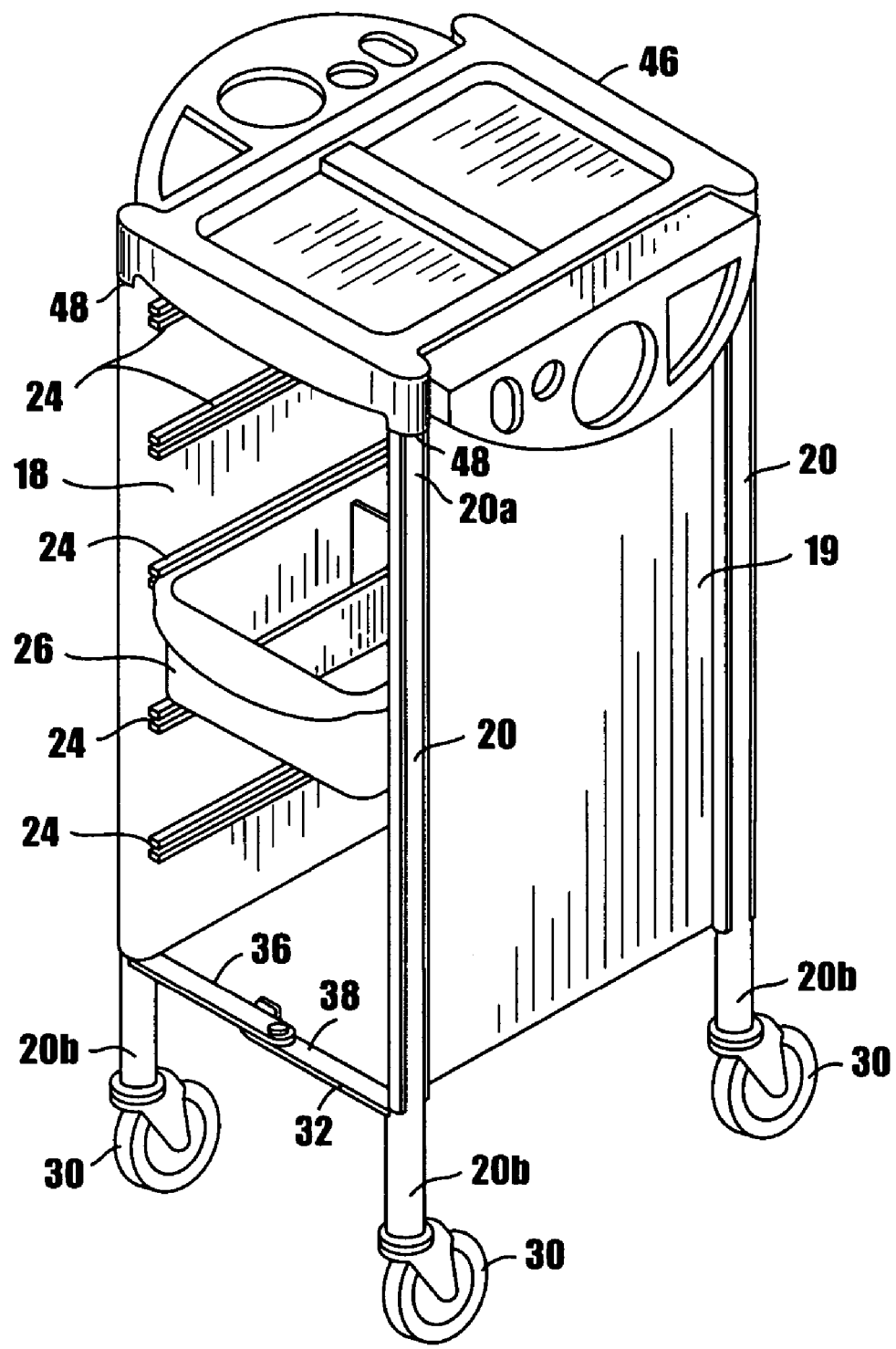
FIG. 7 is a generally perspective view similar to FIG. 6, but showing certain of the components of the apparatus in position on the supporting frame.

After removal of the equipment and supplies that are carried by the top and side members of the trolley, the side members 54 can either be folded into the stored configuration or alternatively they can be disconnected from the top member 46 by simply removing the pivot rods 58 in the manner illustrated in FIG. 6. This done, the top member 46 can be separated from the supporting structure 16 by exerting an upward force on the top member sufficient to separate it from the supporting structure 16 in the manner illustrated in FIG. 6. With the drawers 26 slidably removed from the interior of the supporting structure, the supporting structure can next be conveniently folded from the operating configuration shown in FIG. 4 into the folded configuration illustrated in FIG. 5. This is accomplished by exerting an inward force on the linkage assemblies 32 and 34 proximate their inner pivot point that is sufficient to cause the linkage assemblies to fold inwardly in the manner illustrated in FIG. 5. As the linkage assemblies are folded inwardly sides 18 and 19 move into close proximity thereby substantially minimizing the volume occupied by the support structure 16 for convenience of shipping or storage.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A foldable trolley for transporting articles from place to place comprising:
   (a) a supporting structure including:
      (i) storage means for storing articles, said storage means comprising a drawer;
      (ii) first and second spaced apart, generally parallel upright side frames, said storage means being disposed between said side frames, each said side frame having an upper portion and a lower portion; and each having guide means for guiding slidable travel of said drawer between a first retracted position and a second extended position;
      (iii) a caster rotatably connected to said lower portion of each of said first and second side frames;
      (iv) a foldable link assembly foldably interconnecting said first and second side frames to permit movement thereof between a first operating position and a second folded position, said foldable link assembly comprising first and second pivotally connected links, said first link being also pivotally connected to said first side frame and said second link being also pivotally connected to said second side frame; and
   (b) a top member removably connected to said upper portions of said first and second side frames of said supporting structure when said side frames are in said first operating position.

2. The foldable trolley as defined in claim 1 further including hairdryer support means connected to one of said first and second side frames for removably supporting a hairdryer.

3. The foldable trolley as defined in claim 1 further including an article support member extending from and pivotally interconnected with said top member.

4. The foldable trolley as defined in claim 1 in which each of said first and second side frames comprises a pair of spaced apart, generally parallel tubular columns and a side wall interconnected with and spanning said tubular columns.

5. A foldable trolley for transporting articles from place to place comprising:
   (a) a supporting structure including:
      (i) first and second spaced apart, generally parallel upright side frames, each said side frame having an upper portion and a lower portion and each having a plurality of vertically spaced, generally horizontally extending guide rails;
      (ii) a pair of casters rotatably connected to said lower portion of each of said first and second side frames;
      (iii) a first foldable link assembly foldably interconnecting said first and second side frames to permit movement thereof between a first operating position and a second folded position, said first foldable link assembly comprising first and second pivotally connected links, said first link being also pivotally connected to said first side frame and said second link being also pivotally connected to said second side frame;
      (iv) a second foldable link assembly foldably interconnecting said first and second side frames to permit movement thereof between a first operating position and a second folded position, said second foldable link assembly comprising third and fourth pivotally connected links, said third link being also pivotally connected to said first side frame and said fourth link being also pivotally connected to said second side frame;
   (b) a top member removably connected to said upper portions of said first and second side frames of said supporting structure when said side frames are in said first operating position; and
   (c) a plurality of drawers disposed between and slidably interconnected with said first and second side frames of said supporting structure when said side frames are in said first operating position, said drawers being slidable along said guide rails between a first retracted position and a second extended position.

6. The foldable trolley as defined in claim 5 in which each of said first and second side frames comprises a pair of spaced apart, generally parallel tubular columns and a side wall interconnected with and spanning said tubular columns.

7. The foldable trolley as defined in claim 6 further including hairdryer support means connected to one of said tubular columns of one of said first and second side frames for removably supporting a hairdryer.

8. The foldable trolley as defined in claim 6, further including an article support member extending from and pivotally interconnected with said top member.

9. A foldable trolley for use in beauty salons for transporting articles from place to place comprising:
   (a) a supporting structure including:
      (i) first and second spaced apart, generally parallel upright side frames, each said side frame having an upper portion and a lower portion and each having:
         a. a pair of spaced apart, generally parallel tubular columns, each said column having an upper extremity and a lower extremity; and
         b. a plurality of vertically spaced, generally horizontally extending guide rails connected to said tubular columns;
      (ii) a caster rotatably connected to said lower extremity of each of said tubular columns of said first and second side frames;
      (iii) a first foldable link assembly foldably interconnecting said first and second side frames to permit movement thereof between a first operating position and a second folded position, said first foldable link assembly comprising first and second pivotally connected links, said first link being also pivotally connected to said first side frame and
      (iv) said second link being also pivotally connected to said second side frame;
      (v) a second foldable link assembly foldably interconnecting said first and second side frames to permit movement thereof between a first operating position and a second folded position, said second foldable link assembly comprising third and fourth pivotally connected links, said third link being also pivotally connected to said first side frame and said fourth link being also pivotally connected to said second side frame;
   (b) a molded plastic top member removably connected to said upper portions of said first and second side frames of said supporting structure when said side frames are in said first operating position, said molded plastic top member having spaced apart article receiving recess and a plurality of spaced apart sockets for receiving said upper extremities of said tubular columns of said first and second side frames; and
   (c) a plurality of drawers disposed between said first and second side frames of said supporting structure when said side frames are in said first operating position, said drawers being slidable along said guide rails between a first retracted position and a second extended position.

10. The foldable trolley as defined in claim 9 further including hair dryer support means connected to one of said tubular columns of one of said first and second side frames for removably supporting a hairdryer.

11. The foldable trolley as defined in claim 9, further including an article support member extending from and pivotally interconnected with said top member.

\* \* \* \* \*